Nov. 17, 1970  A. G. CONRAD  3,541,413
CONSTANT-TORQUE ALTERNATING CURRENT SINGLE
PHASE MOTOR SYSTEM
Filed Aug. 8, 1969  2 Sheets-Sheet 1

*INVENTOR.*
ALBERT G. CONRAD

BY  H. W. Brelsford

*ATTORNEY*

A - $X_1 = X_2 = 152.0$ OHMS
B - $X_1 = X_2 = 72.0$ OHMS
C - $X_1 = X_2 = 63.5$ OHMS
D - $X_1 = X_2 = 45.0$ OHMS
$E_{12} = 212$ VOLTS 60 CYCLES

INVENTOR.
ALBERT G. CONRAD
BY H.W. Brelsford
ATTORNEY

United States Patent Office 3,541,413
Patented Nov. 17, 1970

3,541,413
CONSTANT-TORQUE ALTERNATING CURRENT SINGLE PHASE MOTOR SYSTEM
Albert G. Conrad, 4591 Camino del Mirasol,
Santa Barbara, Calif. 93105
Filed Aug. 8, 1969, Ser. No. 848,636
Int. Cl. H02p 7/36
U.S. Cl. 318—244        7 Claims

ABSTRACT OF THE DISCLOSURE

A single-phase alternating-current motor system is provided wherein the motor components form part of a control system to provide a constant developed torque regardless of speed changes. This is accomplished by maintaining a constant current through the motor armature and by maintaining its field flux constant for all operating speeds and for standstill conditions. A constant armature current is obtained by connecting one side of the armature to a tuned circuit and the other side to a mid tap of the field winding. A constant field flux is obtained by connecting the field directly to the voltage source. The tuned circuit provides an armature current which is fixed in phase relation to the field flux and which is constant in magnitude.

---

This invention relates to single-phase, alternating-current motors and has particular reference to an electrical system that produces a constant-torque output regardless of the load or armature speed.

One of the objectives of the new system is to provide a motor drive that produces essentially constant torque from the output shaft of the armature which is free to change speed to that required by the load that it drives.

Another objective is to provide a means by which the constant torque can be adjusted for greater or lesser torque, and once the magnitude of the torque has been established it will remain constant within the entire speed range of the motor from 0 to 100%. The invention could be described as a constant-torque motor system that is adjustable in its torque magnitude.

Another object is to provide the above characteristics without the use of electronic control systems or feed-back devices.

A feature of the invention is the provision of constant torque without the use of rheostats which necessarily waste power.

Another objective of the invention is to provide a constant-torque motor system which delivers the constant torque even when the load torque is greater than the developed torque of the motor, and the motor is driven backwards, or negatively, from the direction of its developed torque. In such cases the system acts as a constant-torque brake on the load.

Other objects, advantages and features of the invention will be apparent in the following description considered together with the attached drawings forming an integral part of this disclosure, and are illustrative of presently preferred embodiments of the invention and in which.

Figure 1:
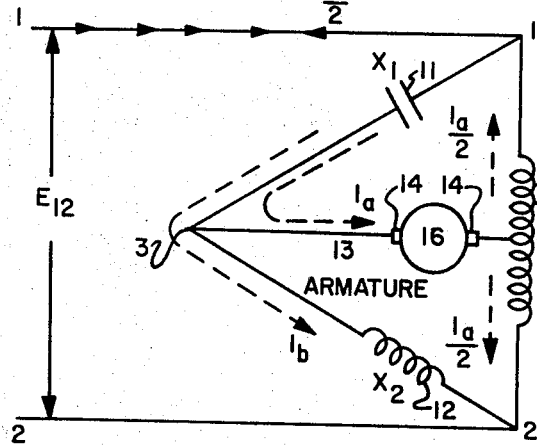
FIG. 1 is a schematic diagram showing one form of the system in which field windings are supplied from an alternating current source and the armature is supplied from the voltage obtained between a mid tap of the field winding and the junction of a resonant circuit connected to the voltage supply.
Figure 2:
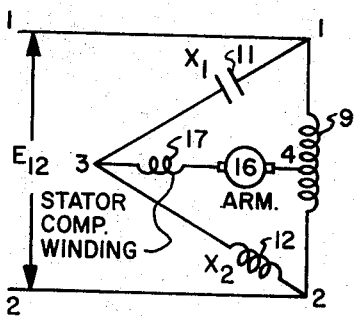

FIG. 2 is a modified form of schematic diagram displaying the same features as FIG. 1 except that a compensating winding, connected in series with the armature, is located on the stator, having a magnetic axis which is 180° out-of-phase with that of the armature. This compensating winding will reduce the voltage on the armature circuit and improve the power factor of this circuit and also the power factor of the motor input.

Figure 3:
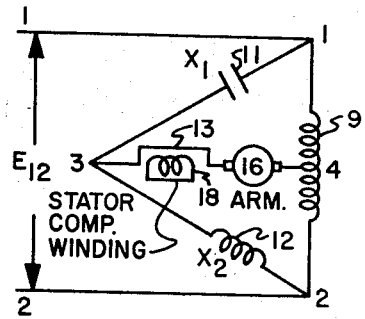

FIG. 3 shows the same circuit as that of FIG. 2 except that inductive compensation is provided on the stator and is used instead of series compensation shown in FIG. 2.

Figure 4:
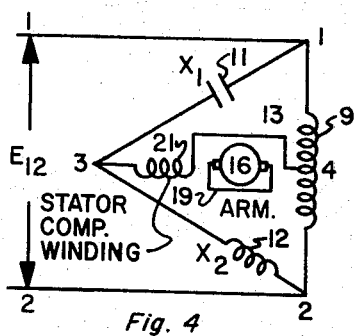

FIG. 4 shows essentially the same circuit as that of FIG. 2 except that the armature is inductively fed through transformer action between armature and a compensating field winding.

Figure 5:
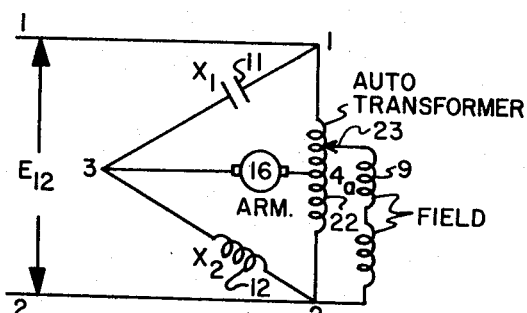

FIG. 5 is similar to FIG. 1 except that the main field winding is not used as a voltage divider. In this case the armature current is supplied to a center tapped adjustable transformer. An adjustable tap on this transformer provides for changes in the magnitude of the field flux $\phi$. The changes in the magnitude of the flux result in changes in the developed torque. The method of supplying the field winding illustrated in FIG. 5 is applicable to other systems, FIGS. 1–4.

Figure 6:
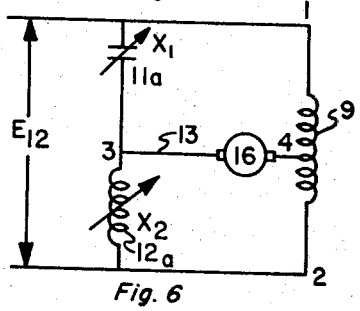

FIG. 6 is similar to FIG. 1 except that adjustments in the magnitude of the armature current are obtained by adjusting the magnitude of the capacitance and inductance of the tuned circuit to obtain adjustments in torque magnitude while the field flux remains constant.

Figure 7:
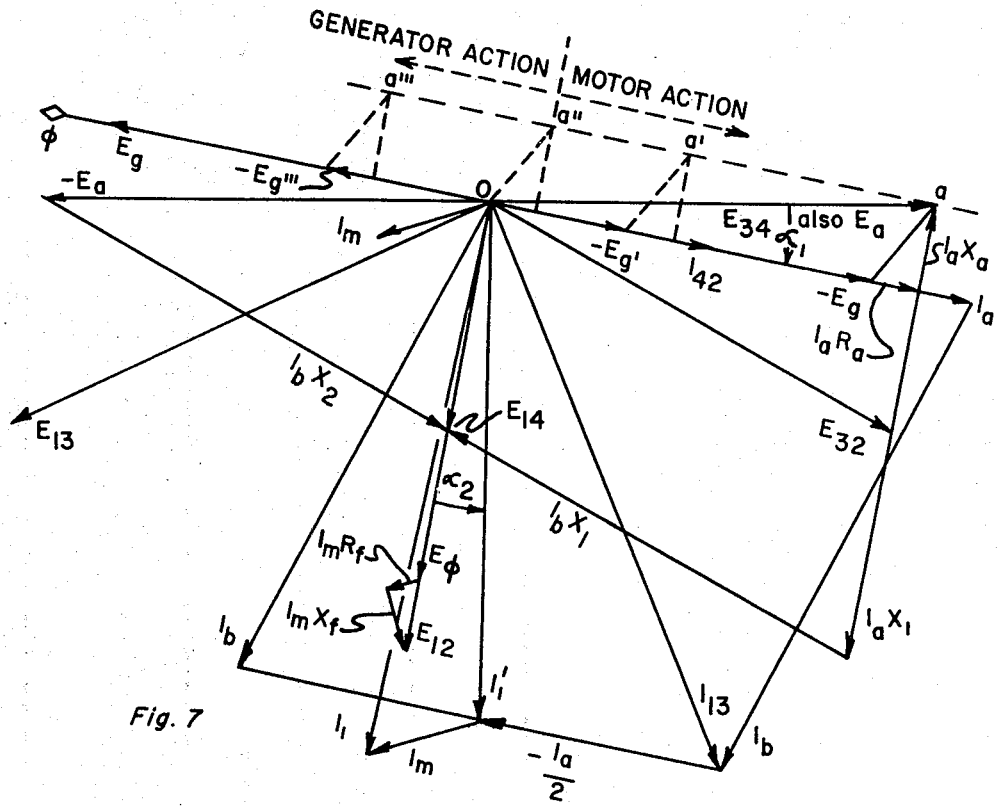

FIG. 7 shows a phasor diagram that illustrates the relationships of the voltages and currents inherent to the circuit of FIG. 1. The principles of operation revealed by this relationship of FIG. 1 prevail in other diagrams, FIGS. 2–6.

Figure 8:
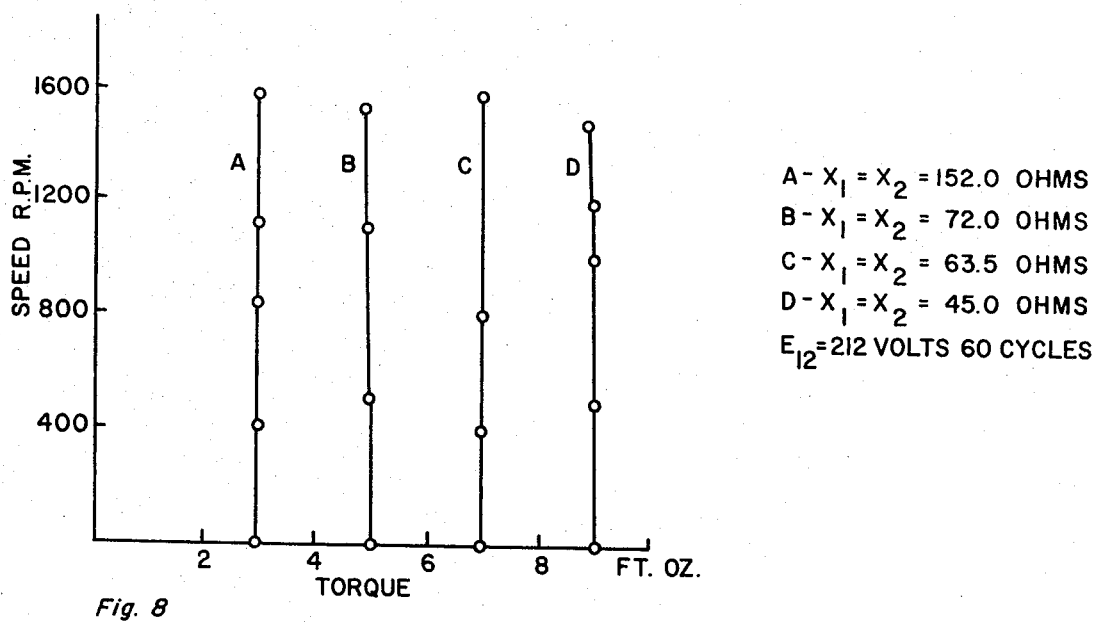

FIG. 8 shows speed-torque characteristics of the motor obtained experimentally with the connections of FIG. 6 wherein different loads allowed different armature speeds for a given torque, and armature current was adjusted to a specific value for each of the characteristics by changing the magnitude of the inductance and capacitance of the tuned circuit.

Referring to FIG. 1 there is illustrated a source of single-phase alternating voltage 1–2 across which is connected to a field winding 9 of the stator. This is also shown as 9 in FIG. 1A. Also connected across the source 1–2 is a tuned circuit consisting of a capacitor 11 having a reactance $X_1$ connected in series with an inductor 12 having reactance $X_2$. Between the capacitor 11 and inductor 12 is a junction or connecting point 3 having a conductor 13 connected thereto, the other end of which is connected to a brush 14 on an armature 16. The other brush 14 is connected to a mid point 4 on the field winding 9.

A current passes through the field windings and is designated $I_m$. Two separate current components pass through the capacitor 11: one is the armature current designated $I_a$ and the other is the current that passes through the inductor 12 designated $I_b$. The current $I_a$ passing through the armature 16 splits at the field winding 9 and parts flow upwardly toward 1 and is designated $I_a$ and divided by 2 or $I_a/2$ and a similar one-half of the armature current flows toward 2 with a similar designation. At the top of FIG. 1 these currents are summarized and the vector or phasor aspects are designated by the dot over the phasors. Thus the total current $I_1$ equals $$\dot{I}_a + \dot{I}_b + \dot{I}_m - \frac{\dot{I}_a}{2}$$

Considering now the voltages, it will be noted that the field winding 9 serves as a voltage divider so that the voltage between points 1 and 4 (designated $E_{14}$) is equal to the voltage between points 4 and 2 (designated $E_{42}$)

and that their sum is equal to the voltage between points 1 and 2 (designated $E_{12}$) the source voltage. The reactance $X_1$ at the capacitor 11 is equal to the resistance $X_2$ at the inductor 12.

A simple analysis of the behavior of the circuit of FIG. 1 can be derived by dealing with component currents in the various elements as follows (also shown graphically in FIG. 7):

The field winding 9 will carry the magnetizing current $I_m$ from the source $E_{12}$. This current will cause a voltage drop in the field winding 9 resulting from the field resistance, $I_m R_f$, and the field leakage reactance, $I_m X_f$. The remaining field voltage $E_\phi$ is associated with a flux, $\phi$ which passes through the armature but which is not magnetically coupled with the armature circuit. The flux vector $\phi$ must be 90 electrical degrees behind $E_\phi$. Rotation of the armature 16 in the field flux, $\phi$ will cause a generator voltage in the armature $E_g$ which is in time phase with the flux $\phi$. The total voltage in the armature circuit is the sum of the negative value of $E_g$, the resistance drop of the armature circuit, $I_a R_a$, and the reactance drop of the armature circuits, $I_a X_a$. The current $I_a$ flows through the armature circuit from 3 to 4. The voltage from 3 to 4 is referred to as $E_{34}$ and also as $E_a$, the armature circuit voltage.

Vectorially the voltages of FIG. 1 can now be expressed as follows (vector quantities are indicated by a dot over the voltage E or over the current I):

$$\dot{E}_{13} = \dot{I}_a X_1 + \dot{I}_b X_1 \quad (1)$$
$$\dot{E}_{14} = \dot{I}_a X_1 + \dot{I}_b X_1 + \dot{E}_{34} \quad (2)$$
$$\dot{E}_{42} = \dot{I}_b X_2 - \dot{E}_{34} \quad (3)$$

Adding
(2) and (3) $\dot{E}_{12} = \dot{I}_a X_1 + \dot{I}_b (X_1 + X_2)$
but $\dot{I}_b(X_1+X_2)=0$ (tuned circuit)
Eliminating $I_b$ $E_{12} = I_a X_1$
Transposing $I_a = \dfrac{E_{12}}{X_1}$ Thus the armature current is constant for a fixed value of $E_{12}$ and a fixed value of $X_1$. Since $X_1$ is capacitive, $I_a$ leads the voltage $E_{12}$ by 90 electrical degrees. The armature circuit is resistive and inductive. $I_a$ will therefore lag the armature voltage $E_{34}$ by some angle $\alpha_1$.

Referring now to FIG. 7 as applies to FIG. 1 the voltage $E_{14}$ (center of diagram) from Equation 2 is the vector sum of $I_a X_a$ (right hand part of diagram) (drawn at right angles to the current $I_a$), $E_{34}$, and $I_b X_1$. The location of the vector $I_b X_1$ must be such that it is equal and opposite to $I_b X_2$. This relationship establishes the magnitude and direction of $E_{14}$. The voltage $E_{12}$ is double the value of $E_{14}$ and in the same direction. $I_b$ will lag the voltage $E_{32}$ by 90 electrical degrees and in magnitude is equal to $E_{23}$ divided by $X_2$. The armature current $I_a$ (upper right in FIG. 7) enters the junction of the fields at 4 (FIG. 1) flowing in equal amounts to 1 and 2 (FIG. 1). Thus this load current from 4 to 1 and from 4 to 2 equals one-half of $I_a$ and the load components (designated by a prime mark) of the input current (total input current minus exciting current $I_m$) is $$\dot{I}_1' = \dot{I}_b + \frac{\dot{I}_a}{2}$$

This locates the position and determines the magnitude of $I_1'$. A complete analysis shows that $I_1'$ leads the voltage $E_{12}$ by an electrical angle of $\alpha_2$ degrees and that $\alpha_2$ is equal to $\alpha_1$, the phase angle between the armature current and the armature circuit voltage. Thus the power factor of the load component $I_1'$ of the input current is equal to the power factor of the armature circuit between 3 and 4, but the angle is reversed. An inductive load connected between the points 3 and 4 will appear as a capacitative load at the input terminals 1 and 2.

Figure 1A:
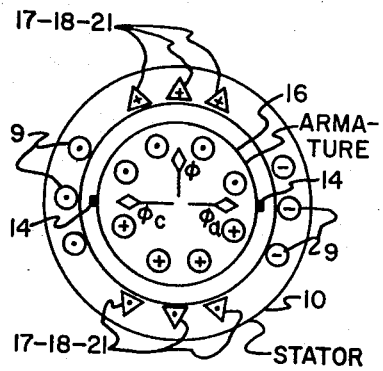
FIG. 1A is a diagram of a stator or armature with diagrammatic representation of the windings of FIGS. 2 through 5 but showing also the windings of FIGS. 1 and 6.

Referring now to FIG. 2, the conductor 13 for the armature 16 has a portion 17 wound on the stator 10 (FIG. 1A). This winding 17 is so located that it has a magnetic axis that is 180° out of phase with that of the armature. This compensating winding will reduce the voltage on the armature circuit and improve the power factor of the motor input.

Referring now to FIG. 3, the stator 10 (FIG. 1A) has a short circuited winding 18 that is so located that it has a magnetic axis that is 180° out of phase with that of the armature. Improvement of the power factor is the same as that in FIG. 2.

Referring now to FIG. 4 the armature circuit conductor 13 has a portion 21 wound on the stator 10 (FIG. 1A) in such a position that it produces a magnetic field that is 180° out of phase with that of the armature. The armature 16 is short circuited by a conductor 19 and current is induced in the armature 16 by transformer action between the armature 16 and the compensating winding 21. Improvement of the power factor is the same as in FIG. 2. No transformer action takes place between the field winding 9 and the armature because they are not magnetically coupled.

Referring now to FIG. 1A there is illustrated the stator 10 previously referred to, the armature 16 and the brushes 14. The circles in the armature represent the usual armature windings with the direction of current flow at any given instant of a source cycle indicated by the usual cross and dot. The stator 10 has circles representing the field windings 9 and triangles 17–18–21 representing the compensating windings 17, 18 and 21 of FIGS. 2, 3 and 4 respectively. The current flow in these windings at the same instant of time is indicated by crosses and dots in the triangles. The flow of current in the windings 9 gives rise to the field flux $\phi$ represented by the vertical arrow. Current flow in the armature gives rise to an armature flux $\phi_a$ represented by a horizontal arrow, and current flow through the compensating windings 17-18-21 gives rise to an opposing flux $\phi_c$ represented by an arrow in the opposite direction. The brushes 14 are representative of a commutated armature and merely act as terminals for the armature.

Referring now to FIG. 5, an auto transformer winding 22 is connected between points 1 and 2 and a mid point is tapped at 4a for the armature connection. The transformer has an adjustable tap or slider to which the motor field winding 9 is connected. The auto transformer serves two functions—it supplies the armature 16 and also the field 9. By moving the slider 23 various amounts of current flow in the field winding 9 and the strengths of the magnetic field $\phi$ are established proportionately. Since the torque varies directly with the strength of the field $\phi$ when armature current is constant, this provides a convenient means for a wide range of adjustment at variable constant torque within the capability (from 0 to 100% speed) of the system.

Illustrated in FIG. 6 is another circuit for adjustably varying the output torque, and in this case the field current remains constant and the armature current is adjustable. An adjustable capacitor 11a is connected in series to an adjustable inductor 12a and a mid point 3 is connected to the armature 16 by condutcor 13.

The range of values of reactances $X_1$ and $X_2$ of the capacitor-inductor pair are such as to result in a tuned circuit with the applicable voltage and frequency of the source 1–2. The amount of current in conductor 13 can be adjusted by varying the values of 11a and 12a, while the field flux $\phi$ remains constant because of the fixed flow of exciting current through the field winding 9.

Referring now to FIG. 8 there is illustrated a graph of the measured output of a particular motor system of the type shown in FIG. 6. At the right are the different values of $X_1$ and $X_2$ selected for capacitor-inductor pairs 11a and 12a and labeled A, B, C and D. The motor tested had an approximate rating of ¼ horsepower, 212 volts, and 60 cycles. The load was varied to give various motor speeds and torque was measured in foot-ounces. The graphs show the contancy of the torque at different speeds for any selected pair, A, B, C or D of values of capacitance $X_1$ and inductance $X_2$.

It will be recognized that when the field winding 9 is placed on a stator core, it becomes an auto transformer to supply voltage to the armature circuit. The field winding 9 therefore serves the dual purpose of providing a field flux and providing a supply for the armature.

Referring again to FIG. 7, there is illustrated in the upper part thereof, the generator action which occurs when the torque of the load overcomes the torque produced by the motor system, and the armature is driven backwards. This can be referred to as a negative armature direction of rotation as compared to the armature direction when acting as a motor, which can be referred to as a positive armature speed. Positive rotation of the armature in the field flux causes a voltage $E_g$ (upper left) in the armature circuit. This is a back electromotive force which must be overcome by the applied voltage $E_a$. Starting from the origin O is a vector to the right, $-E_g$, which is the component of this armature voltage which, when added to the impedance voltage of the armature, gives $E_a$. The magnitude of $-E_g$ reduces to zero as the armature speed reduces to zero. As the armature speed passes through zero (origin O) and becomes negative, the $-E_g$ remains the same in sign but is now in an opposite direction indicated by the vector $-E_g'''$ emanating at O and directed to the left. The "motor" is now acting as a generator and supplying energy to the source. This demonstrates that negative armature speeds create a generator action and also demonstrates that the constant torque is still imposed on the load, but can now be referred to as a constant-torque brake. The broken lines leading to the points $a'''$, $a''$, $a'$, and $a$, indicate different armature speeds. The vector $-E_g'''$ appears for armature speed $a'''$, which is a negative armature speed.

It will be appreciated by those skilled in thhe art that the principle expounded here can be embodied in a large number of different systems, circuits, motors and apparatus. There is illustrated only presently preferred embodiments as required by the rules and further experience would indicate future preferred forms. The embodiments described are therefore illustrative only and are not intended to be limiting or definitive of the invention.

I claim:

1. A system, including a single phase electric motor, that produces a constant torque regardless of the speed of the motor and which receives energy from a single phase alternating source, comprising:
    (a) field circuit constructed on a stator element supplied from said source which produces an alternating flux of essentially constant magnitude, and essentially constant magnitude, and essentially 90 electrical degrees out of phase with the source voltage, said field circuit having a mid-tap that provides an additional use of the field circuit as an auto transformer;
    (b) an armature circuit including a drum type armature mounted to rotate in the stator structure and having a commutated armature winding with two terminals, said armature winding having a magnetic axis that is 90 electrical degrees out of phase in space with the magnetic axis of said field winding and one terminal of said armature is connected to the mid-tap of the field circuit;
    (c) a tuned circuit having a capacitor and an inductor connected in series and connected to said source and having a terminal at the junction of the capacitor and the inductor that is connected to the other terminal of the armature from that connected to the mid-tap of the field circuit, said tuned circuit providing a current to the armature circuit which is constant in magnitude and essentially 90 electrical degrees out of phase with the alternating voltage of the source, said current being essentially in time phase with flux produced by the field circuit, providing interaction of field flux and armature current to produce essentially constant torque regardless of motor speed.

2. A motor system as set forth in claim 1 wherein the power factor of the armature circuit is improved by a compensating winding on the stator that is connected in series with the armature to produce a magnetic flux that is 180 electrical degrees out of phase with the armature magnetic flux, thereby reducing the armature circuit reactance.

3. A motor system as set forth in claim 1 wherein the power factor of the armature circuit is improved over that of claim 1 by providing a compensating winding on the stator that is short circuited and current is induced in said compensating winding by transformer action with the armature to produce a magnetic flux that is essentially 180 electrical degrees out of phase with the armature magnetic flux, thereby reducing the armature circuit reactance.

4. A motor system as set forth in claim 1 wherein the power factor of the armature circuit is improved by providing a compensating winding on the stator that is connected between the mid-tap of the main field circuit and the junction of the tuned circuit and a short circuiting conductor is provided for the armature, said compensating winding being so located as to produce a magnetic flux which is essentially 180 electrical degrees out of phase with the magnetic flux produced by the short-circuited current of the armature that is produced by the transformer action of the compensating winding and the armature winding.

5. A motor system as set forth in claim 1 wherein the field flux is adjustable in magnitude by providing an additional auto transformer that has a mid-tap to which one side of the armature is connected instead of the field mid-tap and has an adjustable tap, and the field windings are energized from the adjustable tap of the auto transformer, whereby adjustable amounts of current flow through the field windings to give variable amounts of field flux.

6. A motor system as set forth in claim 1 wherein the armature current is adjustable in magnitude by providing an adjustable tuned circuit wherein the values of capacitance and inductance are both adjustable, to determine the amount of current flowing in the armature and thereby adjust the amount of torque delivered by said armature.

7. The combination of the system of claim 1 and means for mechanically driving the armature backwards against the motor torque, whereby said system automatically acts as a constant torque brake on said means by the phenomenon of electrical regenerative braking.

References Cited

UNITED STATES PATENTS

| | | | |
|---|---|---|---|
| 295,454 | 3/1884 | Sprague | 318—257 |
| 1,845,173 | 2/1932 | Nyman | 318—244 |
| 2,192,050 | 2/1940 | Norcross | 318—244 |
| 2,991,402 | 7/1961 | Imada et al. | 318—221 |
| 3,295,035 | 12/1966 | Field | 318—245 |

ORIS L. RADER, Primary Examiner

G. RUBINSON, Assistant Examiner